United States Patent
Usami et al.

(10) Patent No.: US 7,885,019 B2
(45) Date of Patent: Feb. 8, 2011

(54) LENS DRIVING APPARATUS AND METHOD OF MANUFACTURING THE LENS DRIVING APPARATUS

(75) Inventors: Yoshiya Usami, Saitama (JP); Tatsuya Iwata, Saitama (JP)

(73) Assignee: Pioneer Corporation, Tokyo (JP)

( * ) Notice: Subject to any disclaimer, the term of this patent is extended or adjusted under 35 U.S.C. 154(b) by 133 days.

(21) Appl. No.: 12/438,214

(22) PCT Filed: Aug. 25, 2006

(86) PCT No.: PCT/JP2006/316710

§ 371 (c)(1),
(2), (4) Date: Mar. 10, 2009

(87) PCT Pub. No.: WO2008/023433

PCT Pub. Date: Feb. 28, 2008

(65) Prior Publication Data

US 2010/0007971 A1 Jan. 14, 2010

(51) Int. Cl.
*G02B 7/02* (2006.01)
(52) U.S. Cl. ..................................... 359/811; 359/819
(58) Field of Classification Search ................ 359/811, 359/813, 814, 815, 819, 821, 824, 826
See application file for complete search history.

(56) References Cited

FOREIGN PATENT DOCUMENTS

| JP | 4-325931 | * 11/1992 |
|----|----------|-----------|
| JP | 2001-229557 | 8/2001 |
| JP | 2002-56551 | 2/2002 |
| JP | 2002-133681 | 5/2002 |
| JP | 2006-31759 | 2/2006 |
| JP | 2006-172552 | 6/2006 |

OTHER PUBLICATIONS

JP 4-325931 Abstract.*
International Search Report for International Application No. PCT/JP2006/316710, mailed Nov. 7, 2006.
Japanese-language International Preliminary Report on Patentability with Amended Sheets, dated Dec. 11, 2008.

* cited by examiner

*Primary Examiner*—Timothy J Thompson
(74) *Attorney, Agent, or Firm*—Nixon & Vanderhye P.C.

(57) ABSTRACT

A lens drive device has (i) an objective lens and (ii) a lens holder, to a side face of which coils for drive control are attached. The surface where the coils are adhered, or the side surface, is an irregular surface where a recess/projection section for restricting the direction of flow of an adhesive is formed. The coils and the lens holder are integrally formed together by the adhesive with the recess/projection section in between.

10 Claims, 4 Drawing Sheets

[FIG. 1]
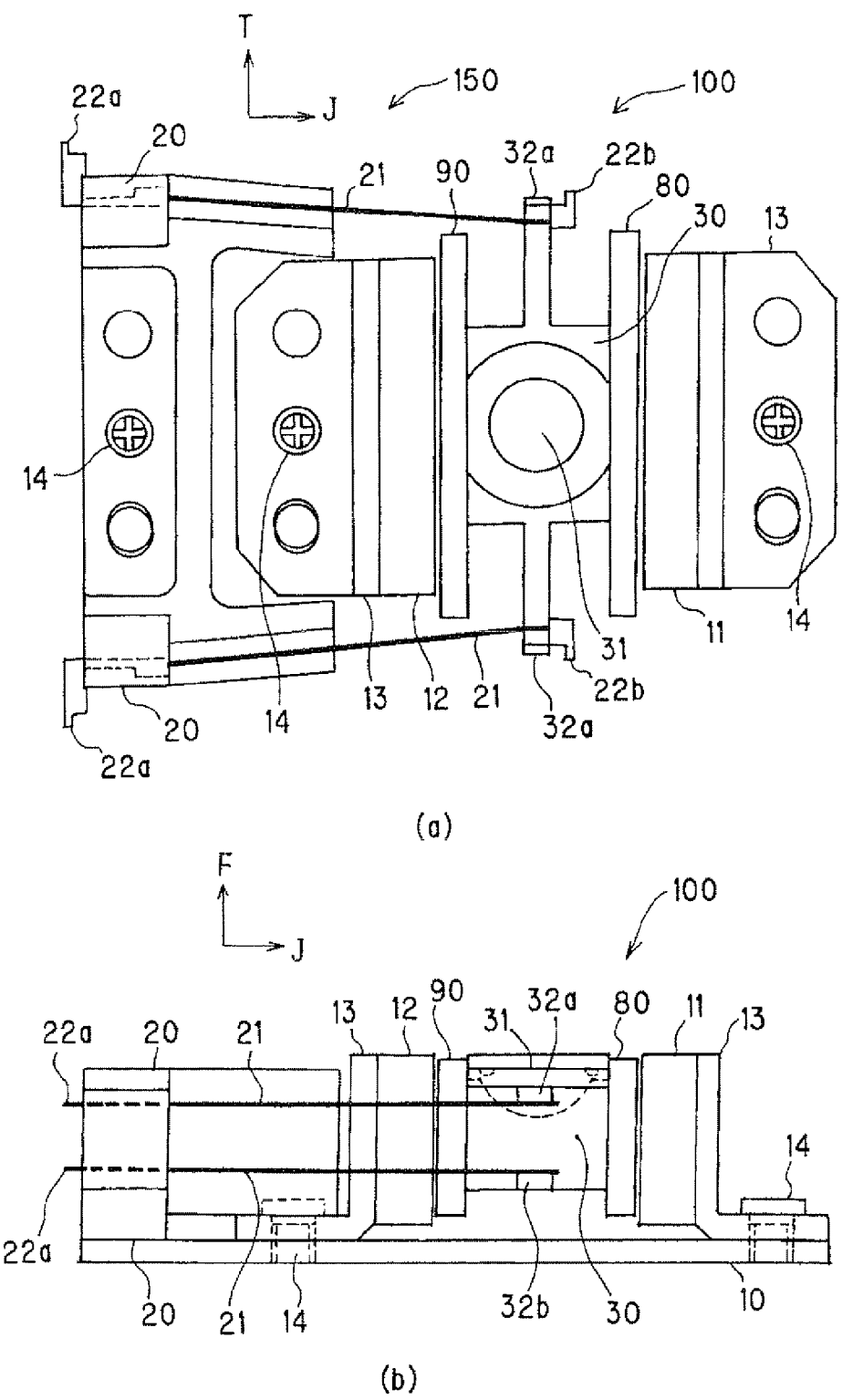
(a)
(b)

[FIG. 2]
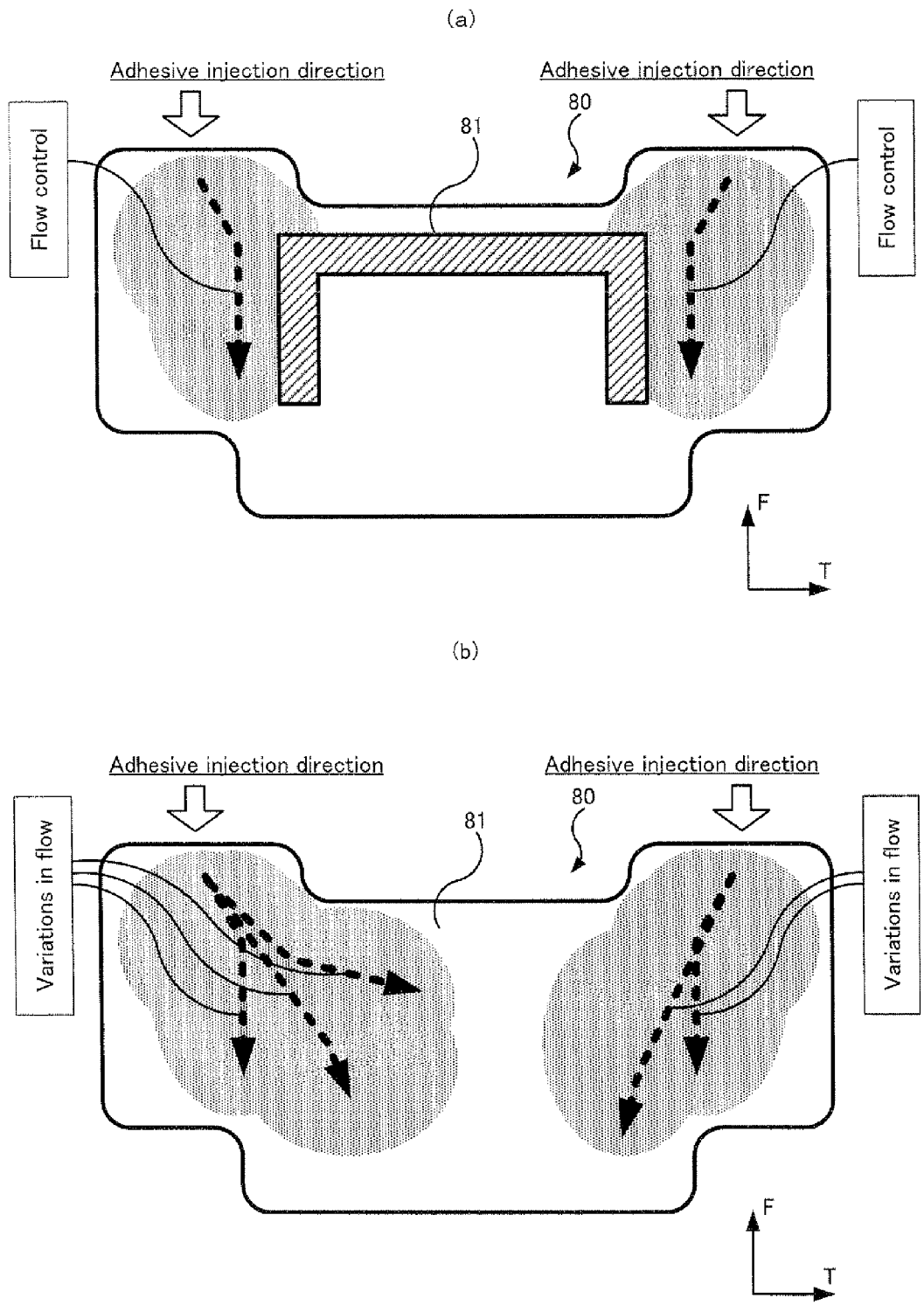

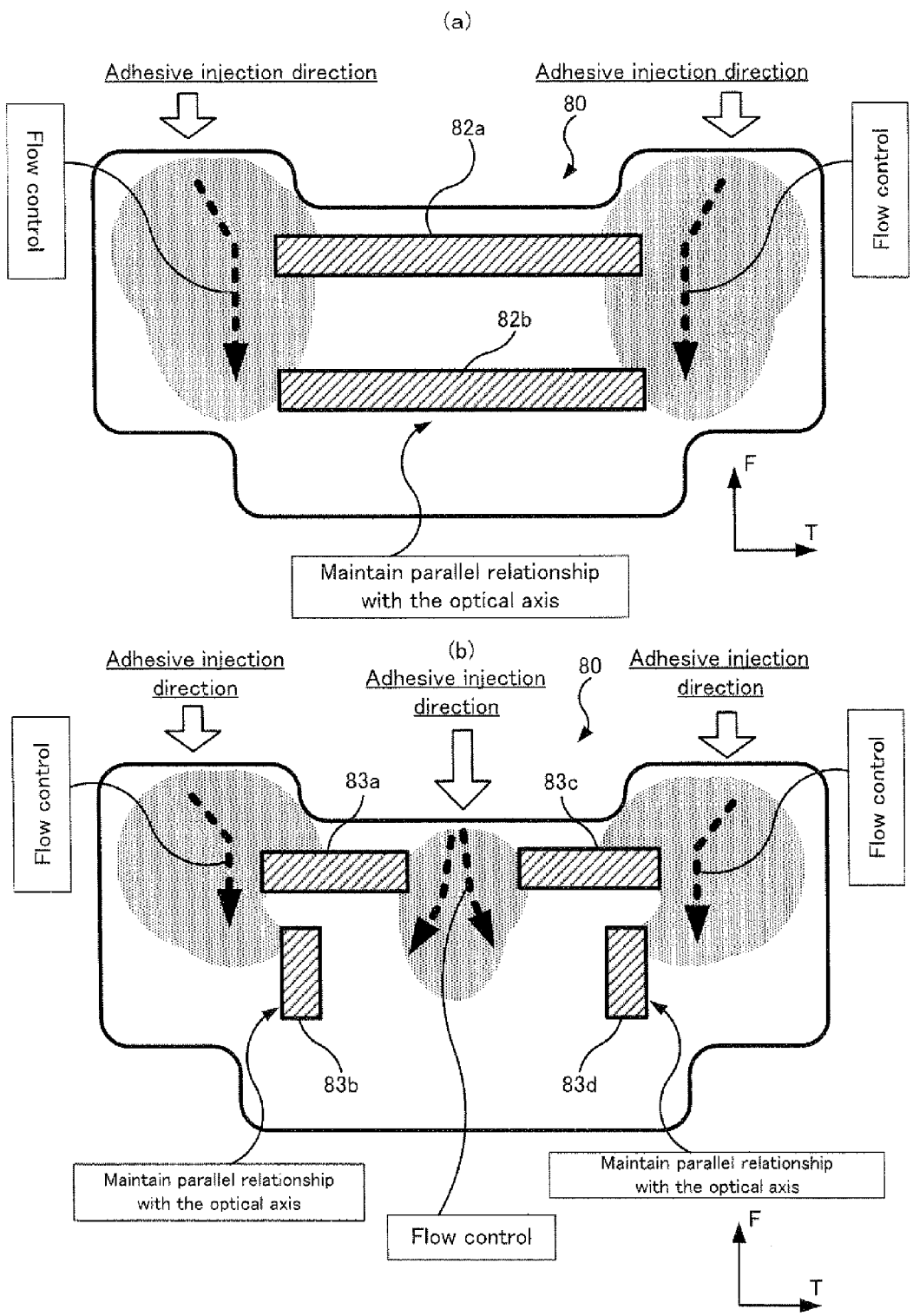
[FIG. 3]

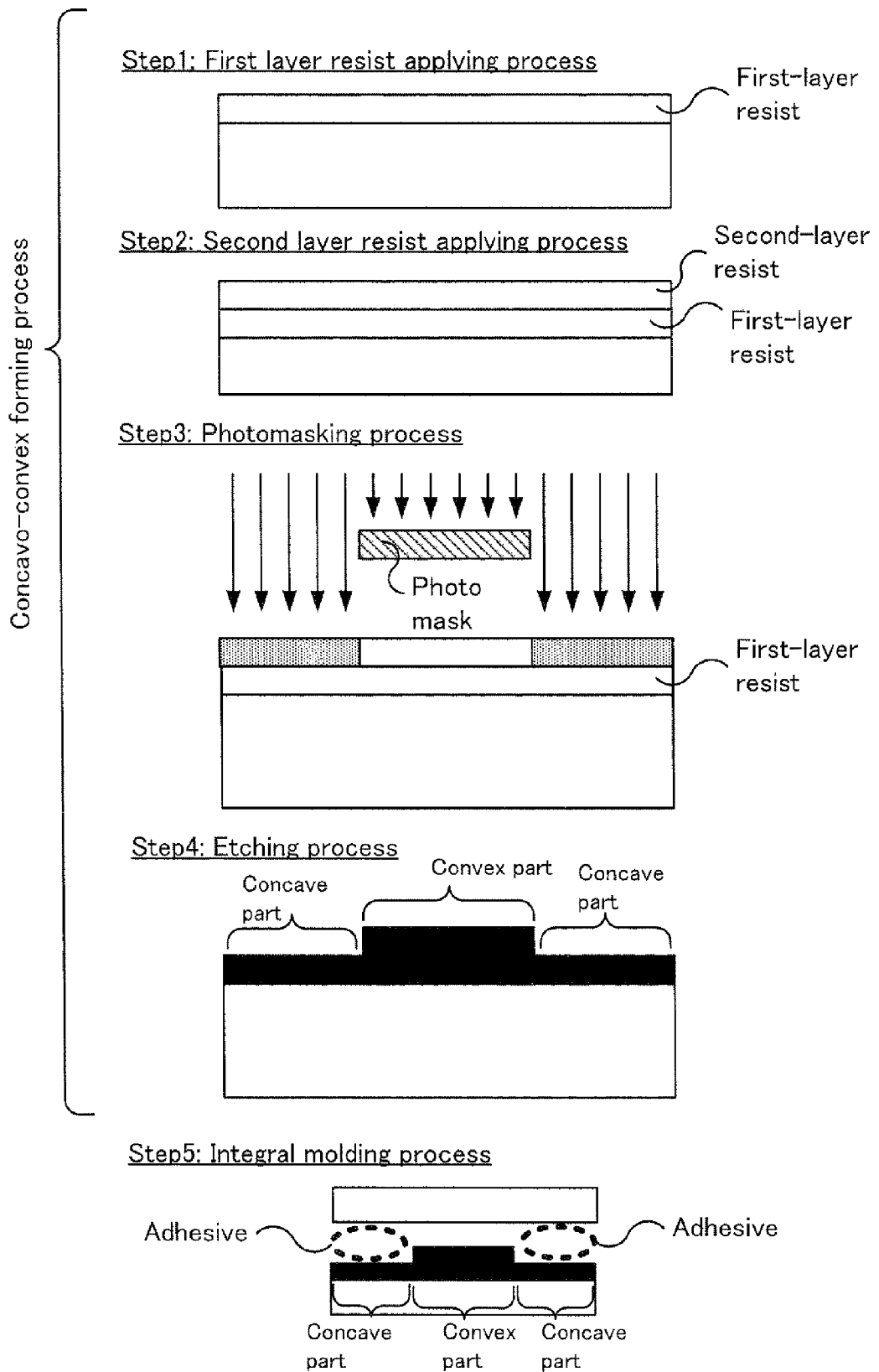

LENS DRIVING APPARATUS AND METHOD OF MANUFACTURING THE LENS DRIVING APPARATUS

This application is the U.S. national phase of International Application No. PCT/JP2006/316710, filed 25 Aug. 2006, the entire contents of which is hereby incorporated by reference.

TECHNICAL FIELD

The present invention relates to the structure of a lens driving apparatus of a disc player for recording information onto a disc-shaped recording medium and reading the recorded information, and a method of manufacturing the lens driving apparatus.

BACKGROUND ART

There is known such a lens driving apparatus that drives an objective lens in a lens optical axis direction (or focus direction) in order to focus a reading beam on a disc surface, that drives the objective lens in an orthogonal direction (or tracking direction) orthogonal to the lens optical axis direction in order to make the reading beam follow an information track, and that drives the objective lens in a warping direction (or tilt direction) of the disc surface in order to irradiate the disc surface with the reading beam with the optical axis of the reading beam being perpendicular to the disc surface, when information is read from a disc on which the information is optically recorded. One example of such a lens driving apparatus is disclosed in a patent document 1 or the like. The lens driving apparatus is of a print coil type in which a planar coil substrate, formed by patterning and etching a focus coil and a tracking coil, is fixed by an adhesive to the both side surfaces of a lens holder with a built-in objective lens.

Patent document 1: Japanese Patent Application Laid Open NO. 2001-229557

Patent document 2: Japanese Patent Application Laid Open NO. 2006-31759

DISCLOSURE OF INVENTION

Subject to be Solved by the Invention

The aforementioned lens driving apparatus, however, has such a technical problem that if the flowing direction of an adhesive is not controlled when the coils and the both side surfaces of the lens holder are integrally molded, there arise variations in the flowing direction of the adhesive, adhesive distribution, and adhesive thickness, between the adhesive surface of the coil and the side surfaces of the lens holder. Thus if a driving force is applied to the integrally molded lens holder, for example, there is a significant influence on vibration such as pitching resonance (or secondary resonance) corresponding to the focus direction, leading to reduction in quality of servo control and deterioration in quality of information reading or writing with respect to a disc-shaped recording medium, which is technically a problem.

In view of the aforementioned problem, it is therefore an object of the present invention to provide a lens driving apparatus which allows more appropriate integral molding of the coils and the side surfaces of the lens holder, and a method of manufacturing the lens driving apparatus.

Means for Solving the Subject

The above object of the present invention can be achieved by a lens driving apparatus according to claim 1 provided with at least a lens holder (i) which has an objective lens; and (ii) in which a coil for driving control is mounted on side surface thereof, either an adhesive surface of the coil and the side surface being a concavo-convex surface on which a concavo-convex part for controlling a flowing direction of a fluid adhesive, is formed, the coil and the lens holder being integrally molded by the adhesive via the concavo-convex surface.

The above object of the present invention can be also achieved by a method of manufacturing a lens driving apparatus according to claim 8 provided with at least a lens holder (i) which has an objective lens; and (ii) in which a coil for driving control is mounted on side surface thereof, the method provided with: a concavo-convex forming process of forming either an adhesive surface of the coil and the side surface as a concavo-convex surface on which a concavo-convex part for controlling a flowing direction of a fluid adhesive, is formed; and an integral molding process of integrally molding the coil and the lens holder by the adhesive via the concavo-convex surface.

The operation and other advantages of the present invention will become more apparent from the embodiments explained below.

BEST MODE FOR CARRYING OUT THE INVENTION

Hereinafter, an explanation will be given on a lens driving apparatus and a method of manufacturing the lens driving apparatus in embodiment of the present invention as the best mode for carrying out the present invention.

Embodiment of Lens Driving Apparatus

An embodiment of the lens driving apparatus of the present invention is a lens driving apparatus provided with at least a lens holder (i) which has an objective lens; and (ii) in which a coil for driving control is mounted on side surface thereof, either an adhesive surface of the coil and the side surface being a concavo-convex surface on which a concavo-convex part for controlling a flowing direction of a fluid adhesive, is formed, the coil and the lens holder being integrally molded by the adhesive via the concavo-convex surface.

According to the embodiment of the lens driving apparatus of the present invention, in general, a magnetic field is formed between a pair of magnets by oppositely placing the pair of magnets at a predetermined distance. By electrically charging the coil such as a FP (Fine Pattern) coil, mounted on the side surfaces of the lens holder having the objective lens in the magnetic field, the lens holder, which is held by a pair of linear elastic members fixed to the support part of the lens driving apparatus, is inclined and is displaced in the focus direction and the tracking direction.

In particular, in the embodiment, either the adhesive surface of the coil or the side surfaces of the lens holder is the concavo-convex surface on which the concavo-convex part for controlling the flowing direction of the fluid adhesive is formed, and the coil and the lens holder are integrally molded by the adhesive via or through the concave-convex surface.

If the flowing direction of the adhesive is not controlled in the integral molding of the coil and the side surfaces of the lens holder in the objective lens driving apparatus, there arise variations in the flowing direction of the adhesive, distribution of the adhesive, and thickness of the adhesive, between the adhesive surface of the coil and the side surfaces of the lens holder. Thus if a driving force is applied to the integrally molded lens holder, for example, there is a significant influence on vibration such as pitching resonance (or secondary resonance) corresponding to the focus direction.

In contrast, in the embodiment, the flowing direction of the adhesive is controlled in the integral molding of the coil and the side surfaces of the lens holder. Thus even if the driving force is applied to the integrally molded lens holder in the focus direction, in the tracking direction, or in the tilt direction, it is possible to reduce or eliminate the influence on the vibration such as pitching resonance, more effectively. As a result, in addition to improving the quality of servo control, it is possible to improve the quality of reading of signal or writing of signal with respect to a disc-shaped recording medium.

In one aspect of the embodiment of the lens driving apparatus of the present invention, a concavo-convex shape pattern of the concavo-convex surface is defined on the basis of (i) a position at which the adhesive is injected, (ii) a direction in which the adhesive is injected, or (iii) the flowing direction of the adhesive in the integral molding.

According to this embodiment, in the integral molding of the coil and the side surfaces of the lens holder, the flowing direction of the adhesive is controlled on the basis of the aforementioned concavo-convex shape pattern. Therefore, even if the driving force is applied to the integrally molded lens holder in the focus direction, in the tracking direction, or in the tilt direction, it is possible to reduce or eliminate the influence on the vibration such as pitching resonance, more effectively.

In another aspect of the embodiment of the lens driving apparatus of the present invention, a concavo-convex shape pattern of the concavo-convex surface is defined on the basis of a tracking direction, a focusing direction, or a tilt direction in which the lens holder is driven.

According to this aspect, the concavo-convex shape pattern is controlled, for example, on the basis of the amount of the adhesive (i.e. adhesive force) required on the basis of the focus direction, the tracking direction, or the tilt direction. Therefore, even if the driving force is applied to the integrally molded lens holder in the focus direction, in the tracking direction, or in the tilt direction, it is possible to reduce or eliminate the influence on the vibration such as pitching resonance, more effectively.

In another aspect of the embodiment of the lens driving apparatus of the present invention, (i) a first convex part in a relatively long shape in a tracking direction and (ii) a second convex part in a relatively long shape in a focusing direction, are formed on the concavo-convex surface.

According to this aspect, in the integral molding of the coil and the side surfaces of the lens holder, the flowing direction of the adhesive is controlled on the basis of the aforementioned first convex part and second convex part. Therefore, even if the driving force is applied to the integrally molded lens holder in the focus direction, in the tracking direction, or in the tilt direction, it is possible to reduce or eliminate the influence on the vibration such as pitching resonance, more effectively.

In another aspect of the embodiment of the lens driving apparatus of the present invention, (i) a first convex part in a relatively long shape in a tracking direction and (ii) a second convex part for making the concavo-convex surface substantially parallel to an optical axis of the objective lens, are formed on the concavo-convex surface.

According to this aspect, on the basis of the first convex part and the second convex part having substantially the same thickness as the first convex part, it is possible (i) to make the convex-concavo surface parallel to the optical axis of the objective lens and (ii) to hold the integrally molded lens holder substantially perpendicular to the optical axis without any force applied from the exterior. As a result, it is possible to omit a force for making the integrally molded lens holder substantially parallel to the optical axis, and it is also possible to effectively reduce the electric power consumption of control current provided for the coil in order to perform various servo control.

In another aspect of the embodiment of the lens driving apparatus of the present invention, (i) a convex part located in a substantially central portion in a tracking direction and (ii) two concave parts formed with the convex part therebetween, are formed on the concavo-convex surface.

According to this aspect, it is possible to effectively control the adhesive, injected at line-symmetric positions, not to randomly diffuse and flow, on the basis of the convex part located in the central portion and the concave parts located on the both sides, which are disposed substantially line-symmetrically. As a result, with regard to the lens holder, it is possible (i) to increase the area size of the adhesive surface on the basis of the adhesive injected at the line-symmetric positions, (ii) to control the flowing direction of the adhesive more highly accurately, and (iii) to increase an adhesive force in the integral molding.

In another aspect of the embodiment of the lens driving apparatus of the present invention, the concavo-convex surface is formed on the basis of masking process, which varies a position and light intensity of an irradiated laser beam; and an etching process, on the adhesive surface of the coil or the side surface, on which a photosensitive resin (or photoresist) is applied doubly or in a two-layer manner.

According to this aspect, the concavo-convex part can be formed more highly accurately on the basis of the masking process and the etching process on the concavo-convex surface on which the photosensitive resin is applied doubly or in the two-layer manner.

Embodiment of Method of Manufacturing a Lens Driving Apparatus

An embodiment of the method of manufacturing a lens driving apparatus of the present invention is a method of manufacturing a lens driving apparatus provided with at least a lens holder (i) which has an objective lens; and (ii) in which a coil for driving control is mounted on side surface thereof the method provided with: a concavo-convex forming process of forming either an adhesive surface of the coil and the side surface as a concavo-convex surface on which a concavo-convex part for controlling a flowing direction of a fluid adhesive, is formed; and an integral molding process of integrally molding the coil and the lens holder by the adhesive via the concavo-convex surface.

According to the embodiment of the method of manufacturing a lens driving apparatus of the present invention, firstly, in the concavo-convex forming process, either the adhesive surface of the coil for driving control or the side surfaces of the lens holder is formed as the concavo-convex surface on which the concavo-convex part for controlling the flowing direction of the fluid adhesive is formed.

Then, in the integral molding process, the coil for driving control and the lens holder are integrally molded by the adhesive via the aforementioned concavo-convex surface.

As a result, it is possible to simply and appropriately manufacture the lens driving apparatus provided with the lens holder in which the coil for driving control and the lens holder are integrally molded by the adhesive via the concavo-convex surface on which the concavo-convex part for controlling the flowing direction of the fluid adhesive is formed.

Incidentally, in response to the various aspects of the aforementioned embodiment of the lens driving apparatus of the present invention, the embodiment of the method of manufacturing the lens driving apparatus of the present invention can also employ various aspects.

In one aspect of the embodiment of the method of manufacturing a lens driving apparatus of the present invention, the concavo-convex forming process forms the concavo-convex surface on the basis of (i) an applying process of applying a photosensitive resin (or photoresist) doubly or in a two-layer manner; (ii) a masking process, which varies a position and light intensity of an irradiated laser beam; and (iii) an etching process.

According to this aspect, the concavo-convex forming process is provided with the following three processes along time series, in order to form the aforementioned concavo-convex shape pattern of the concavo-convex surface. Firstly, in (i) the applying process, the photosensitive resin (or photoresist) is applied doubly or in the two-layer manner on either the adhesive surface of the coil for driving control or the side surfaces of the lens holder. Then, in (ii) the masking process, for example, a laser beam is irradiated in changing a position of an irradiation and light intensity, on the basis of photomasking. In the position or area irradiated with the laser beam, the second-layer photoresist, which is outer side of the doubly applied photoresist, is exposed. Then, in (iii) the etching process, the concavo-convex surface is formed by dipping the surface in a developer.

As a result, it is possible to more simply and highly accurately manufacture the lens driving apparatus in which the coil for driving control and the lens holder are integrally molded by the adhesive via the concavo-convex surface on which the concavo-convex part for controlling the flowing direction of the fluid adhesive, is formed.

The operation and other advantages of the present invention will become more apparent from the examples explained below.

As explained above, according to the embodiment of the lens driving apparatus of the present invention, it is provided with at least: (i) an objective lens; and (ii) a lens holder in which a coil for driving control is mounted on side surfaces thereof, either an adhesive surface of the coil and the side surfaces being a concavo-convex surface on which a concavo-convex part for controlling a flowing direction of a fluid adhesive is formed, the coil and the lens holder being integrally molded by the adhesive via the concavo-convex surface. As a result, since the flowing direction of the adhesive is controlled in the integral molding of the coil and the side surfaces of the lens holder, even if the driving force in the focus direction, the tracking direction, or the tilt direction is applied to the integrally molded lens holder, it is possible to reduce or eliminate the influence on the vibration such as pitching resonance, more effectively. As a result, in addition to improving the quality of servo control, it is possible to improve the quality of information reading or writing with respect to a disc-shaped recording medium.

Moreover, according to the embodiment of the method of manufacturing the lens driving apparatus of the present invention, it is provided with the concavo-convex forming process and the integral molding process. As a result, it is possible to simply and appropriately manufacture the lens driving apparatus provided with the lens holder in which the coil for driving control and the lens holder are integrally molded by the adhesive via the concavo-convex surface on which the concavo-convex part for controlling the flowing direction of the fluid adhesive is formed.

BRIEF DESCRIPTION OF DRAWINGS

FIG. 1 are a plan view (FIG. 1(*a*)) and a side view (FIG. 1(*b*)) showing the basic structure of a lens driving apparatus 150 in an example of the present invention.

FIG. 2 are a plan view schematically showing a concavo-convex shape pattern formed on either a adhesive surface of the coil or side surfaces of a lens holder in the example (FIG. 2(*a*)) and a plan view schematically showing either the adhesive surface of the coil or the side surfaces of the lens holder in a comparison example (FIG. 2(*b*)).

FIG. 3 are one and another plan views schematically showing the concavo-convex shape pattern formed on either the adhesive surface of the coil or the side surfaces of the lens holder in modified examples (FIG. 3(*a*) and FIG. 3(*b*)).

FIG. 4 is a schematic diagram schematically showing a manufacturing procedure of manufacturing the lens driving apparatus of the present invention in time series.

DESCRIPTION OF REFERENCE CODES 10 actuator base
11, 12 magnet
20 support base
21 support wire
22*a* drawing part
22*b* connection part
30 lens holder
80, 90 coil substrate
100 movable part

EXAMPLE

Hereinafter, the preferred embodiments of the present invention will be explained with reference to the drawings.

(1) Basic Structure

Next, with reference to FIG. 1, the basic structure of a lens driving apparatus 150 in an example of the present invention will be explained.

(1-1) General Structure

Firstly, the general structure of the lens driving apparatus 150 will be explained with reference to FIG. 1. FIG. 1 are a plan view (FIG. 1(*a*)) and a side view (FIG. 1(*b*)) showing the basic structure of the lens driving apparatus 150 in the example of the present invention.

As shown in FIG. 1(*a*) and FIG. 1(*b*), in the lens driving apparatus 150 in the example of the present invention, a pair of L-shaped yokes 13 to which a magnet 11 or 12 for magnetic-field formation is fixed is oppositely placed with a predetermined magnetic gap on a plate-like actuator 10, and fixed to the actuator base 10 by a plurality of screws 14. Moreover, a support base 20 is fixed on the actuator base 10 by the screws 14, and four support wires 21 of the support base 20 support a movable part 100, inclinably at a position where the movable body 100 is sandwiched between the magnets 11 and 12, and movably in the vertical and horizontal directions.

The movable part 100 is provided with a substantially square lens holder 30 which houses an objective lens 31 therein; a coil substrate 80 fixed by an adhesive or the like to the side surface in a jitter direction (an arrow J in FIG. 1) of the lens holder 30 facing the magnet 11; and a coil substrate 90 fixed by an adhesive or the like to the side surface in the jitter direction of the lens holder 30 facing the magnet 12. Four holding parts 32a and 32b, formed and protruding in the tracking direction (an arrow T in FIG. 1) of the lens holder 30, are supported by the four support wires 21. By this, the movable part 100 is supported, inclinably and movably in the focus direction (an arrow F in FIG. 1) and in the tracking direction.

The support wire 21 is made of a rod-like or plate-like conductive elastic member. One end of each support wire 21 is rolled and extended to form a drawing part 22a, and one portion of each support wire 21 is integrally molded within the support base 20 by outsert molding or the like in the molding of the support base 20. The other end of each support wire 21 is similarly rolled and extended to form a connection part 22b and fixed by an adhesive or the like to respective one of the four holding devices 32a and 322b disposed on the lens holder 30.

By oppositely placing the magnets 11 and 12 at a predetermined distance, a magnetic field is formed between the magnets 11 and 12. By electrically charging a coil for tilt control, a coil for focus control, and a coil for tracking control located on the coil substrates 80 and 90 fixed to the lens holder 30 in this magnetic field, the movable part 100 is inclined and is displaced in the focus direction and the tracking direction.

(2) Detailed Structure of Embodiment and Study of Operation and Effect

Next, with reference to FIG. 2, an explanation will be given on the detailed structure of the embodiment, and the study of the operation and effect. FIG. 2 are a plan view schematically showing an concavo-convex shape pattern formed on either a adhesive surface of the coil or side surfaces of a lens holder in the example (FIG. 2(a)) and a plan view schematically showing either the adhesive surface of the coil or the side surfaces of the lens holder in a comparison example (FIG. 2(b)). Incidentally, in FIG. 2 and FIG. 3 described later, as shown by the arrows, the vertical direction i.e. direction which is toward upper side to lower side or the lower side to the upper side, indicates the focus direction, and the horizontal direction i.e. direction which is toward right direction to left direction or the left direction to the right direction, indicates the tracking direction. Moreover, in FIG. 2 and FIG. 3 described later, as one example, a convex part 81 may be formed on the adhesive surface of the coil substrate, or the convex part 81 may be formed on the side surfaces of the lens holder 30.

Specifically, as shown in FIG. 2(a), on the basis of the U-shaped convex part 81, which is relatively long in the tracking direction and which is formed on either the adhesive surface of the coil or the side surfaces of the lens holder, an adhesive is controlled not to randomly flow and diffuse toward the central portion. Because the adhesive is injected at each of the two points on the right and left sides from the upper side to the lower side in the focus direction.

If, as shown in FIG. 2(b), the flowing direction of the adhesive is not controlled in the integral molding of the coils and the side surfaces of the lens holder in the objective lens driving apparatus, there arise variations in the flowing direction of the adhesive, distribution of the adhesive, and thickness of the adhesive, between the adhesive surface of the coil and the side surfaces of the lens holder. Thus if a driving force is applied to the integrally molded lens holder for example, there is a significant influence on vibration such as pitching resonance (or secondary resonance) corresponding to the focus direction.

In contrast, in the example, the flowing direction of the adhesive is controlled on the basis of the U-shaped convex part 81 in the integral molding of the coils and the side surfaces of the lens holder, so even if the driving force is applied to the integrally molded lens holder in the focus direction, in the tracking direction, or in the tilt direction, it is possible to reduce or eliminate the influence on the vibration such as pitching resonance, more effectively. As a result, in addition to improving the quality of servo control, it is possible to improve the quality of reading of signal or writing of the signal with respect to the disc-shaped recording medium.

(3) Modified Examples

Next, with reference to FIG. 3, modified examples of the present invention will be explained. FIG. 3 are one and another plan views (FIG. 3(a) and FIG. 3(b)) schematically showing the concavo-convex shape pattern formed on either the adhesive surface of the coil or the side surfaces of the lens holder in modified examples.

In one modified example of the example, as shown in FIG. 3(a), two elongated, rectangular shaped convex parts 82a and 82b are formed on the adhesive surface of the coil substrate 80. Therefore, on the basis of the convex parts 82a and 82b, an adhesive can be effectively controlled not to randomly flow and diffuse toward the substantially central portion. Because the adhesive is injected at each of the two points on the right and left sides from the upper side to the lower side in the focus direction.

In particular, the convex part 82b located on the lower side in the focus direction, is preferably substantially as thick as the convex part 82a located on the upper side in the focus direction. Therefore, it is possible (i) to make the adhesive surface of the coil and the side surfaces of the lens holder parallel to the optical axis of the objective lens and (ii) to hold the integrally molded lens holder substantially perpendicular to the optical axis without any force applied from the exterior. As a result, it is possible to omit a force for making the integrally molded lens holder substantially parallel to the optical axis, and it is also possible to effectively reduce the electric power consumption of control current provided for the coils in order to perform various servo control.

In another modified example of the example, as shown in FIG. 3(b), a plurality of rectangular shaped convex parts 33a, 83b, 83c, and 83d, formed on the adhesive surface of the coil substrate 80, are arranged substantially line-symmetrically in the focus direction. Therefore, on the basis of the convex parts 83a, 83b, 83c, and 83d, an adhesive can be effectively controlled not to randomly flow and diffuse. Because the adhesive is injected at each of the three points on the central, right, and left sides, from the upper side to the lower side in the focus direction. As a result, with regard to the lens holder, it is possible (i) to increase a area size of the adhesive surface on the basis of the adhesive injected from the separated three points, (ii) to control the flowing direction of the adhesive more highly accurately, and (iii) to increase an adhesive force in the integral molding. It is additionally noted that specifically, according to the study by the present inventors, it is possible to increase the adhesive force using capillarity, caused on the basis of fluidity of the adhesive passing through a gap on the adhesive surface, by arranging concave parts or convex parts line-symmetrically.

In particular, the convex parts 83b and 83d located on the lower side in the focus direction are preferably arranged line-symmetrically and are preferably substantially as thick as the convex parts 83a and 83c located on the upper side in the focus direction. Therefore, it is possible (i) to make the adhesive surface of the coil and the side surfaces of the lens holder parallel to the optical axis of the objective lens and (ii) to hold the integrally molded lens holder substantially perpendicular to the optical axis without any force applied from the exterior.

(4) Manufacturing Method (or Manufacturing Procedure)

Next, with reference to FIG. 4, an explanation will be given on a manufacturing method (or manufacturing procedure) of the lens driving apparatus in the example, including a study of the operation and effect thereof. FIG. 4 is a schematic diagram schematically showing a manufacturing procedure of manufacturing the lens driving apparatus of the present invention, in time series.

As shown in FIG. 4, firstly, in order to form a concavo-convex shape pattern on a concavo-convex surface on which the concavo-convex part for controlling the flowing direction of the fluid adhesive by a concavo-convex forming process, a photosensitive resin (e.g. photoresist) is applied doubly or in a two-layer manner, on either the adhesive surface of the coil for driving control or the side surfaces of the lens holder, in an applying process. Specifically, as shown in a Step 1 in FIG. 4, a viscous photosensitive resin is dropped and applied with a uniform thickness as the first layer, and as shown in a Step 2 in FIG. 4, the photosensitive resin is again dropped and applied with a uniform thickness as the second layer.

Then, in a masking process, for example, a laser beam is irradiated in changing a position of an irradiation and light intensity, on the basis of photomasking or photo-masking method. In the position or area irradiated with the laser beam, the photoresist of the second-layer is exposed. The photoresist of the second-layer is outer side of the doubly applied photoresist.

Then, in an etching process, the concavo-convex surface is formed by dipping the surface in a developer. Specifically, as shown in a Step 3 in FIG. 4, for example, an area which is not covered by a photomask, is irradiated with the laser beam such as an electron beam or ultraviolet with a predetermined laser power. Then, as shown in a Step 4 in FIG. 4, in the portion irradiated with the laser beam, the bond of the photoresist is cut by light energy at the molecule level, so dipping the surface in the developer provides a space, and the concave parts of the concavo-convex part, are formed. In particular, the size of the concave part can be determined depending on the beam radius of the laser beam, in addition to the control of the irradiation position of the laser beam and the control of the laser power. Moreover, the depth of the concave part can be determined depending on the thickness of the photoresist, in addition to the laser power. Incidentally, the laser power desirably appropriately corresponds to the sensitivity of the photoresist.

Then, as shown in a Step 5 in FIG. 4, in an integral molding process, one and the other of (i) the adhesive surface of the coil for driving control and (ii) the side surfaces of the lens holder are integrally molded by injecting an adhesive in the aforementioned concave parts.

Consequently, according to the example, it is possible to more simply and highly accurately manufacture the lens driving apparatus in which (i) the coil for driving control and (ii) the lens holder are integrally molded by an adhesive via the concavo-convex surface on which the concavo-convex part for controlling the flowing direction of the fluid adhesive is formed.

The present invention is not limited to the aforementioned embodiment, but various changes may be made, if desired, without departing from the essence or spirit of the invention which can be read from the claims and the entire specification. A lens driving apparatus and a method of manufacturing the lens driving apparatus, all of which involve such changes, are also intended to be within the technical scope of the present invention.

INDUSTRIAL APPLICABILITY

The lens driving apparatus and a method of manufacturing the lens driving apparatus according to the present invention can be applied to a lens driving apparatus for reproducing an information recording medium such as an optical disc, and a method of manufacturing the lens driving apparatus.

The invention claimed is:

1. A lens driving apparatus comprising at least a lens holder (i) which has an objective lens; and (ii) in which a coil for driving control is mounted on side surface thereof,
   either an adhesive surface of the coil and the side surface being a concavo-convex surface on which a concavo-convex part for controlling a flowing direction of a fluid adhesive, is formed,
   the concavo-convex part for controlling the adhesive which is injected from an upper side to a lower side in a vertical direction, not to flow toward a substantially central portion, being formed at each of both edges in a horizontal direction on the concavo-convex surface,
   the coil and the lens holder being integrally molded by the adhesive via the concavo-convex surface, wherein
   (i) a first convex part in a relatively long shape in a tracking direction and (ii) a second convex part in a relatively long shape in a focusing direction, are formed on the concavo-convex surface.

2. A lens driving apparatus comprising at least a lens holder (i) which has an objective lens; and (ii) in which a coil for driving control is mounted on side surface thereof,
   either an adhesive surface of the coil and the side surface being a concavo-convex surface on which a concavo-convex part for controlling a flowing direction of a fluid adhesive, is formed,
   the concavo-convex part for controlling the adhesive which is injected from an upper side to a lower side in a vertical direction, not to flow toward a substantially central portion, being formed at each of both edges in a horizontal direction on the concavo-convex surface,
   the coil and the lens holder being integrally molded by the adhesive via the concavo-convex surface, wherein
   (i) a first convex part in a relatively long shape in a tracking direction and (ii) a second convex part for making the concavo-convex surface substantially parallel to an optical axis of the objective lens, are formed on the concavo-convex surface.

3. A lens driving apparatus comprising at least a lens holder (i) which has an objective lens; and (ii) in which a coil for driving control is mounted on side surface thereof,
   either an adhesive surface of the coil and the side surface being a concavo-convex surface on which a concavo-convex part for controlling a flowing direction of a fluid adhesive, is formed,
   the concavo-convex part for controlling the adhesive which is injected from an upper side to a lower side in a vertical direction, not to flow toward a substantially central portion, being formed at each of both edges in a horizontal direction on the concavo-convex surface,
   the coil and the lens holder being integrally molded by the adhesive via the concavo-convex surface, wherein
   (i) a convex part located in a substantially central portion in a tracking direction and (ii) two concave part formed with the convex part therebetween, are formed on the concavo-convex surface.

4. The lens driving apparatus according to claim 1, wherein the concavo-convex surface is formed on the basis of masking process, which varies a position and light intensity of an irradiated laser beam; and an etching process, on the adhesive surface of the coil or the side surface, on which a photosensitive resin is applied doubly or in a two-layer manner.

5. The lens driving apparatus according to claim 2, wherein the concavo-convex surface is formed on the basis of masking process, which varies a position and light intensity of an irradiated laser beam; and an etching process, on the adhesive surface of the coil or the side surface, on which a photosensitive resin is applied doubly or in a two-layer manner.

6. The lens driving apparatus according to claim 3, wherein the concavo-convex surface is formed on the basis of masking process, which varies a position and light intensity of an irradiated laser beam; and an etching process, on the adhesive surface of the coil or the side surface, on which a photosensitive resin is applied doubly or in a two-layer manner.

7. A method of manufacturing a lens driving apparatus comprising at least a lens holder (i) which has an objective lens; and (ii) in which a coil for driving control is mounted on side surface thereof, said method comprising:

a concavo-convex forming process of forming either an adhesive surface of the coil and the side surface as a concavo-convex surface on which a concavo-convex part for controlling a flowing direction of a fluid adhesive, is formed; and an integral molding process of integrally molding the coil and the lens holder by the adhesive via the concavo-convex surface, said concavo-convex forming process forming the concavo-convex part for controlling the adhesive which is injected from an upper side to a lower side in a vertical direction, not to flow toward a substantially central portion at each of both edges in a horizontal direction on the concavo-convex surface, wherein said concavo-convex forming process forms the concavo-convex surface on the basis of (i) an applying process of applying a photosensitive resin doubly or in a two-layer manner; (ii) a masking process, which varies a position and light intensity of an irradiated laser beam; and (iii) an etching process.

8. The lens driving apparatus according to claim 1, wherein a concavo-convex pattern of the concavo-convex surface is defined on the basis of a tracking direction, a focusing direction, or a tilt direction in which the lens holder is driven.

9. The lens driving apparatus according to claim 2, wherein a concavo-convex pattern of the concavo-convex surface is defined on the basis of a tracking direction, a focusing direction, or a tilt direction in which the lens holder is driven.

10. The lens driving apparatus according to claim 3, wherein a concavo-convex pattern of the concavo-convex surface is defined on the basis of a tracking direction, a focusing direction, or a tilt direction in which the lens holder is driven.

* * * * *